Patented Apr. 23, 1929.

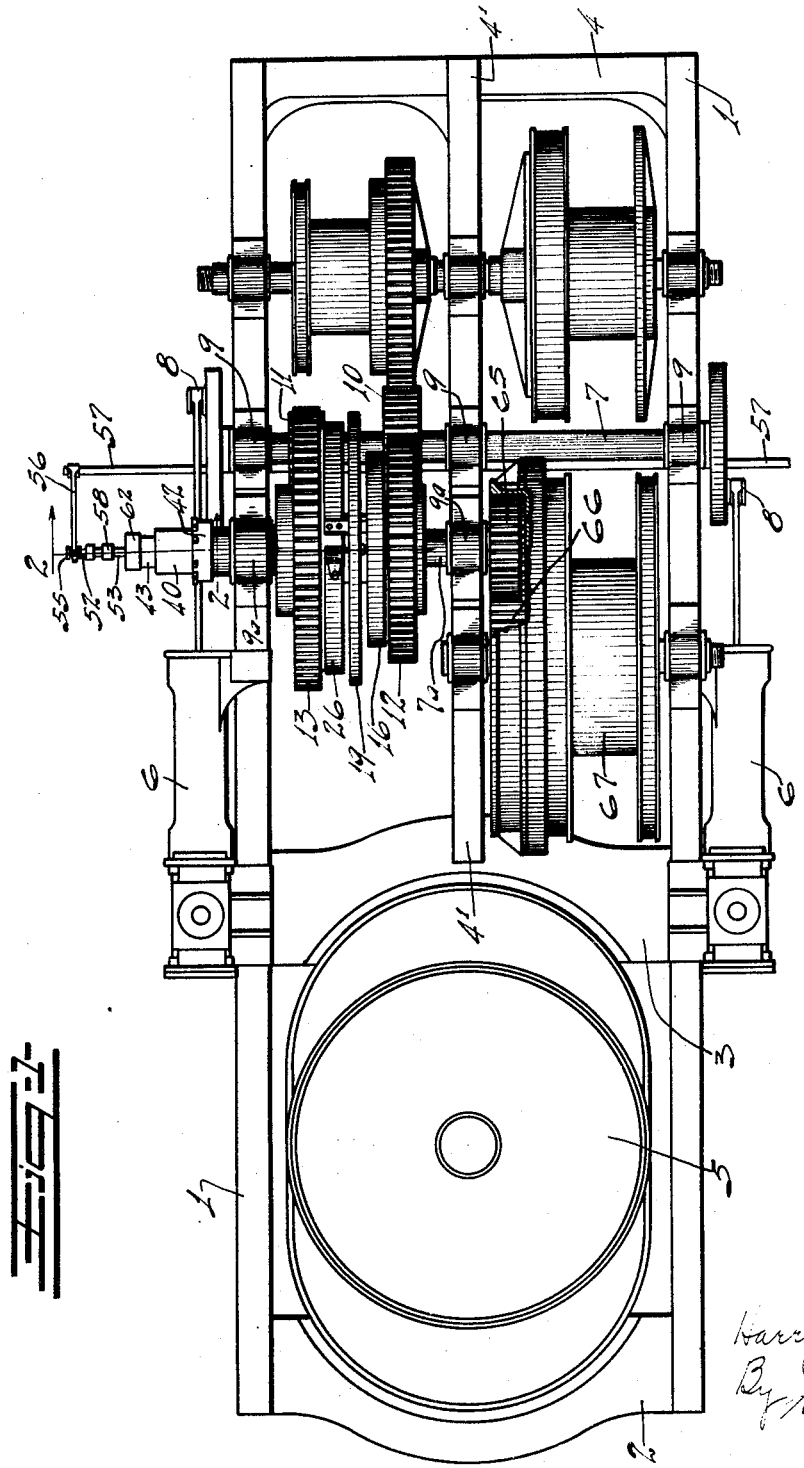

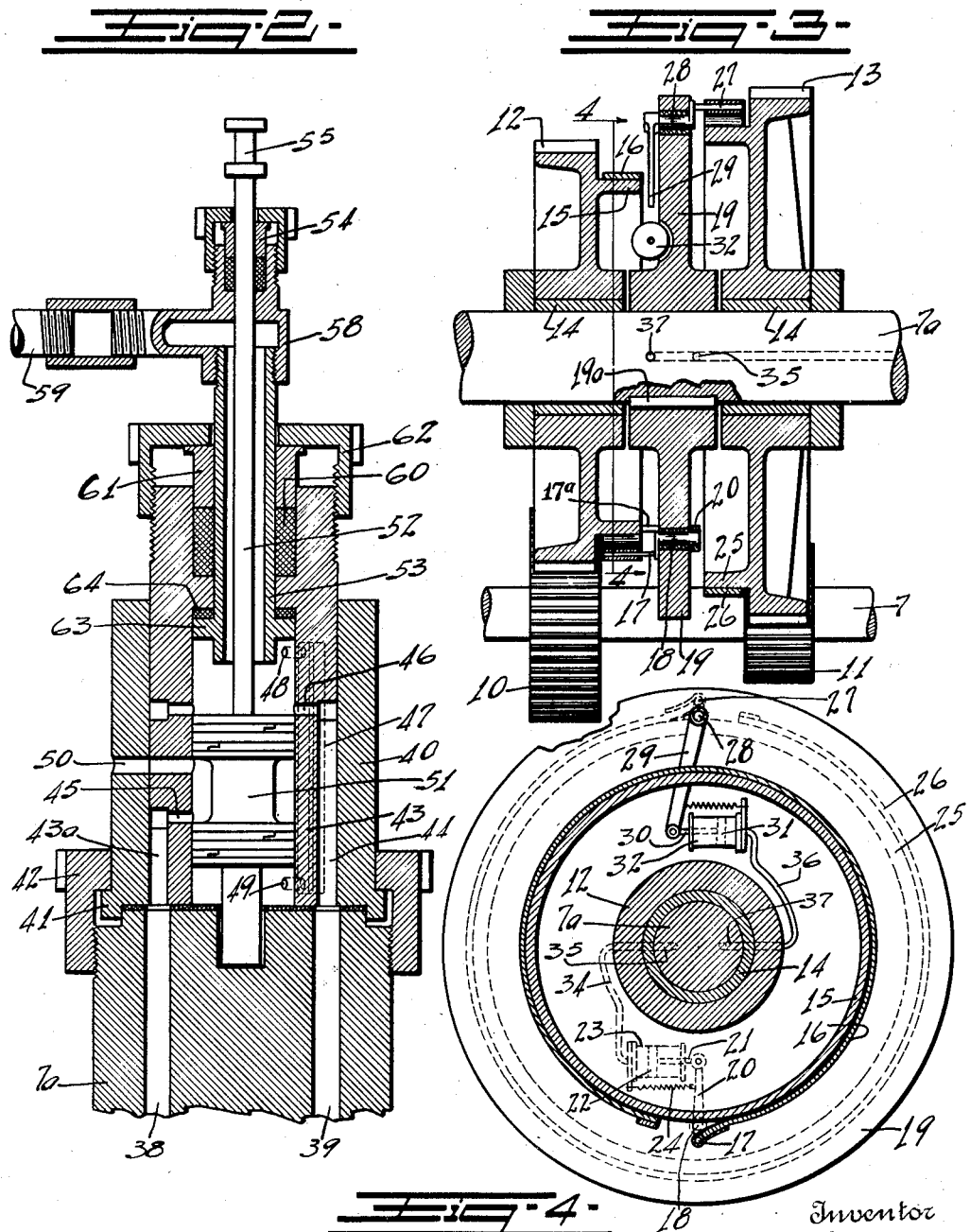

1,710,441

UNITED STATES PATENT OFFICE.

HARRY L. TURNEY, OF PORTLAND, OREGON.

CLUTCH MECHANISM.

Application filed April 16, 1924. Serial No. 706,823.

This invention is designed to afford a clutch mechanism for very heavy duty, particularly such clutch mechanisms as are used with hoisting or logging engines. With these it is desirable to have two speeds for the main drum and the present clutch is rugged and strong enough to operate the drum at the different speeds. Further it lends itself easily to rapid changing from one or the other speeds so that the changes may be made while the parts are in motion.

The invention is illustrated in the accompanying drawings as follows:—

Fig. 1 shows a plan view of a logging engine with my invention in place thereon.

Fig. 2 is a section on the line 2—2 in Fig. 1.

Fig. 3 a vertical section through the axis of the clutch shaft of the clutch mechanism and parts immediately associated therewith.

Fig. 4 a section on the line 4—4 in Fig. 3.

1 marks the sides of the logging engine frame, 2, 3 and 4 cross beams, 4' a central beam, 5 a boiler, 6 the engine, and 7 the drive shaft receiving its motion through a crank 8 from the engine. The drive shaft is journaled in bearings 9—9—9 and an intermediate shaft 7$^a$ is journaled in bearings 9$^a$.

A high speed gear 10 and a low speed gear 11 are fixed on the drive shaft and these drive gears 12 and 13 journaled on bushings 14 on the intermediate shaft 7$^a$.

The gear 12 has a band rim 15 on its inner face on which a clutch band 16 operates. This clutch band has one end mounted on an eccentric pin 17 and the other end is secured on a pin 17$^a$ extending from the driver 19 (see Fig. 3). The eccentric pin is carried by a shaft 18. The shaft 18 is journaled in a driver 19. The other end of the band is anchored on the driver. The driver is fixed on the shaft 7$^a$ by means of a key 19$^a$. A rock lever 20 is fixed on the shaft 18 at the opposite side of the driver from the eccentric pin and a push pin 21 operating from a piston 22 in a cylinder 23 actuates the rock lever and consequently the band. A spring 24 returns the lever 20 and thus loosens the band.

The gear 13 has a similar rim 25 on which a clutch band 26 operates. One end of the band is anchored on the driver and the opposite end is mounted on an eccentric 27. The eccentric 27 is carried by a pin 28 journaled in the driver 19 and a lever 29 is fixed on the pin 28 at the opposite side from the pin 27. The lever is operated upon by a push pin 30 actuated by a piston 31 in a cylinder 32. The cylinder 32 is mounted on the driver 19. While I have shown the gears 12 and 13 as carrying the rims 15 and 25, it will be understood that these are merely gearings which may be of any type communicating movement to these bands.

A pipe 34 leads from the cylinder 23 to a radial opening 35 in the shaft and a similar pipe 36 leads from the cylinder 32 to an opening 37 in the shaft. The openings 35 and 37 connect with the longitudinal passages 38 and 39 in the shaft 7$^a$. A valve chest case 40 is provided with a flange 41 by means of which it is secured by a flanged nut 42 on the end of the shaft. A valve chest 43 extends into the walls of the case 40 and has passages 43$^a$ and 44 arranged in its outer periphery connected by ports 45 and 46 respectively with opposite ends of the valve chest. A longitudinal passage 47 (see dotted lines) is connected by ports 48 and 49 with the opposite ends of the chest so as to convey fluid from the outer end of the chest to the inner end of the chest. An exhaust port 50 is arranged centrally in the chest and a balanced valve 51 of ordinary type operates in the chest over the ports 45 and 46 connecting these alternately with the fluid pressure or the exhaust in the usual manner. The valve 51 has the enlarged head and reduced central portion, the length of the valve being such as to connect the ports 45 and 46 with the ends of the chest and consequently with the steam supply, or with the space between the heads at the ends of the valve and consequently with the exhaust port 50. As shown the port 46 is in communication with the supply and the port 45 with the center of the valve and consequently with the port 50. When the valve is reversed the port 45 is put into communication with the supply and the port 46 with the exhaust. An operating stem 52 extends from the valve through a sleeve 53 and gland 54. The stem is provided with a spool 55 at its outer end which is engaged by an arm 56. The arm 56 is carried by a rod 57 which extends through the frame to a convenient operating position. By operation of the rod the valve may be thrown to actuate either one or the other of the band clutch mechanisms so as to lock either one or the other of the gears with the driver so as to give to the driver a high or low speed as desired.

The gland 54 is mounted in a head 58 which is connected with an actuating fluid supply pipe 59. The sleeve 53 extends through a gland 60 having a follower 61 and a flanged nut 62 operating on the follower. The inner end of the sleeve is provided with a shoulder 63 which operates against a packing or gasket 64. As shown the intermediate shaft carries a gear 65 which operates on an internal gear 66 driving a drum 67.

While I have shown a spur gearing mounted on the shaft I do not wish to be limited to this type of drive and I wish to include in the term "gearing" any rotating driving member.

What I claim as new is:—

1. In a clutch mechanism, the combination of a shaft; two gearings mounted on the shaft; a driver disc fixed on the shaft between the gearings; band clutches between the driver disc and the gearings comprising operating bands; eccentrics mounted on the disc actuating said bands; and fluid actuated motors operating the eccentrics, said motors being mounted on the opposite side of the disc from the respective bands operated by them.

2. In a clutch mechanism, the combination of a shaft; two gearings mounted on the shaft; a driver disc fixed on the shaft between the gearings; band clutches between the driver disc and the gearings comprising operating bands; eccentrics mounted on the disc actuating said bands; fluid actuated motors operating the eccentrics, said motors being mounted on the opposite side of the disc from the respective bands operated by them; and connections to said motors leading through the shaft.

In testimony whereof I have hereunto set my hand.

HARRY L. TURNEY.